(12) United States Patent
Takabatake et al.

(10) Patent No.: US 8,526,074 B2
(45) Date of Patent: Sep. 3, 2013

(54) IMAGE READING APPARATUS WITH READING CHAMBER HAVING COMMON INSERTION/EJECTION PORT FOR ORIGINAL

(75) Inventors: Masanari Takabatake, Ishikawa (JP); Yuki Matsuda, Ishikawa (JP)

(73) Assignee: PFU Limited, Ishikawa (JP)

( * ) Notice: Subject to any disclaimer, the term of this patent is extended or adjusted under 35 U.S.C. 154(b) by 160 days.

(21) Appl. No.: 13/033,879

(22) Filed: Feb. 24, 2011

(65) Prior Publication Data
US 2011/0249303 A1  Oct. 13, 2011

(30) Foreign Application Priority Data

Apr. 12, 2010  (JP) .................. 2010-091196

(51) Int. Cl.
*H04N 1/04* (2006.01)
(52) U.S. Cl.
USPC .......... 358/474; 358/1.12; 358/1.15; 358/505
(58) Field of Classification Search
USPC ................................. 358/473–475
See application file for complete search history.

(56) References Cited

U.S. PATENT DOCUMENTS

2003/0076546 A1* 4/2003 Johnson et al. ............... 358/474
2010/0056049 A1* 3/2010 Hu .............................. 455/41.2

FOREIGN PATENT DOCUMENTS

| JP | 2005-115661 | 4/2005 |
| JP | 2005-260402 | 9/2005 |
| JP | 2009-296092 | 12/2009 |

* cited by examiner

*Primary Examiner* — Benny Q Tieu
*Assistant Examiner* — Marcellus Augustin
(74) *Attorney, Agent, or Firm* — McDermott Will & Emery LLP

(57) ABSTRACT

An image reading apparatus includes an image reading unit that includes light receiving units arranged in two-dimensional array and reads an image on an original in two-dimensional directions, a cover portion that forms a reader chamber with the image reading unit, and a read-start instruction unit that instructs the image reading unit to start reading the image on the original when the original is inserted into the reader chamber. The reader chamber has a space for containing the original therein, and forms an original insertion/ejection port with the cover portion for inserting or ejecting the original therethrough.

10 Claims, 13 Drawing Sheets

IMAGE READING APPARATUS WITH READING CHAMBER HAVING COMMON INSERTION/EJECTION PORT FOR ORIGINAL

BACKGROUND OF THE INVENTION

1. Field of the Invention

The present invention relates to an image reading apparatus.

2. Description of the Related Art

An image reading apparatus includes a light-receiving element for converting detected light into an electrical signal, and electrically processes an image on an original by converting the detected light reflected by the original having the image to be read into the electrical signal by the light-receiving element. In such image reading apparatuses, many of the image reading apparatuses generally read an image on an original by an image reading unit through procedures such as opening a pressure plate which is openable/closable, placing the original on a glass plate under which an image reading unit is provided, closing the pressure plate so that the original is pressed by the pressure plate, and reading the image on the original by the image reading unit.

However, such image reading apparatuses require many procedures for reading the image such as opening and closing the pressure plate, which makes an operation at the time of reading the image burdensome. Moreover, in such conventional image reading apparatuses, the entire apparatus is apt to become larger in size because the pressure plate, which is openable/closable, for pressing the original has to be furnished with. Therefore, in the conventional image reading apparatuses, some are designed to simplify the operation for reading an image on the original and to reduce their sizes.

For example, a portable scanner described in Japanese Laid-open Patent Publication No. 2005-260402 includes a slot-in portion through which a print or photographic copy, which is regarded as an original, is inserted, provided in an outer surface of a body case, and includes an optical unit and a print support mechanism provided inside the body case. Thus, there is no need to provide a member such as a pressure plate for pressing the original and a mechanism for opening and closing the pressure plate, which realizes a downsized device. In addition, when reading an image on the original, it is possible to read the image only by inserting the original through the slot-in portion, which facilitates the operation for reading.

Here, in the case of the downsized image reading apparatus, it is assumed that a user uses the image reading apparatus by holding it in his/her hand. However, the portable scanner described in Japanese Laid-open Patent Publication No. 2005-260402 includes, in its body case, not only an optical unit but also a guide roller for conveying the print and a print support mechanism for pressing the print. Therefore, the size of the scanner tends to be larger because of these devices, which makes it sometimes difficult for the user to perform the reading operation of the original holding the scanner in the user's hand. In addition, if a mechanical scanning mechanism such as the guide roller for conveying a print is provided like the portable scanner described in Japanese Laid-open Patent Publication No. 2005-260402, because this mechanism is sensitive to vibration, this sometimes deteriorates image quality resulting in unclear image and it extends time for scanning at the time of reading the image.

SUMMARY OF THE INVENTION

It is an object of the present invention to at least partially solve the problems in the conventional technology.

According to an aspect of the present invention, an image reading apparatus includes an image reading unit that includes light receiving units arranged in two-dimensional array and reads an image on an original in two-dimensional directions, a cover portion that forms a reader chamber with the image reading unit, the reader chamber having therein a space for containing the original, and forming an original insertion/ejection port with the cover portion for inserting or ejecting the original therethrough, and a read-start instruction unit that instructs the image reading unit to start reading the image on the original when the original is inserted into the reader chamber.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a contact image reading apparatus according to the present invention will be explained in detail below with reference to the accompanying drawings. The present invention is not limited by the embodiments. In addition, constituent elements in the following embodiments include those which are replaceable and easily made by persons skilled in the art or substantially equivalents.

First Embodiment

Figure 1:
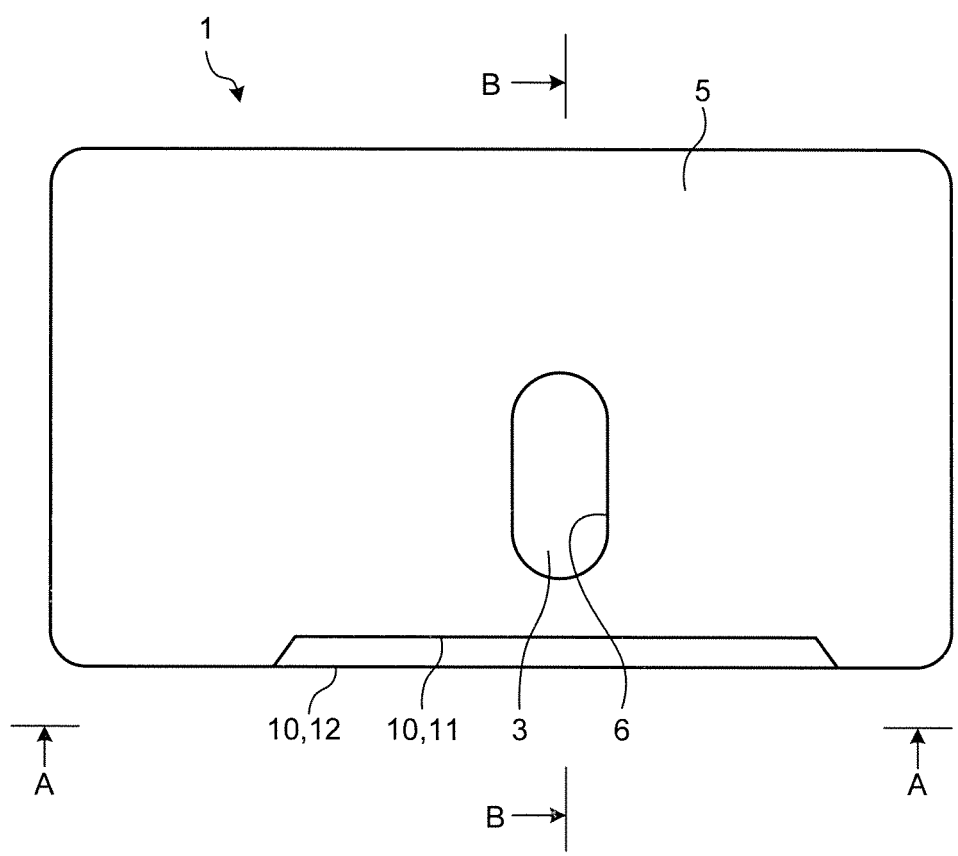
FIG. 1 is a plan view of an image reading apparatus according to a first embodiment.
Figure 2:
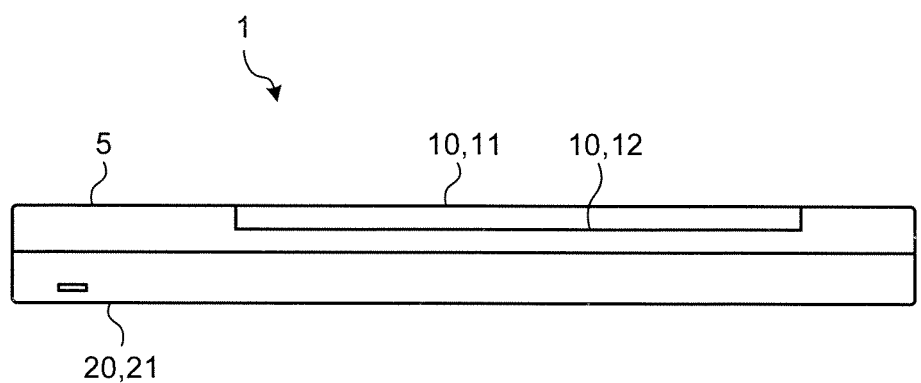
FIG. 2 is a an elevation view viewed along direction of arrows A-A of FIG. 1.
Figure 3:
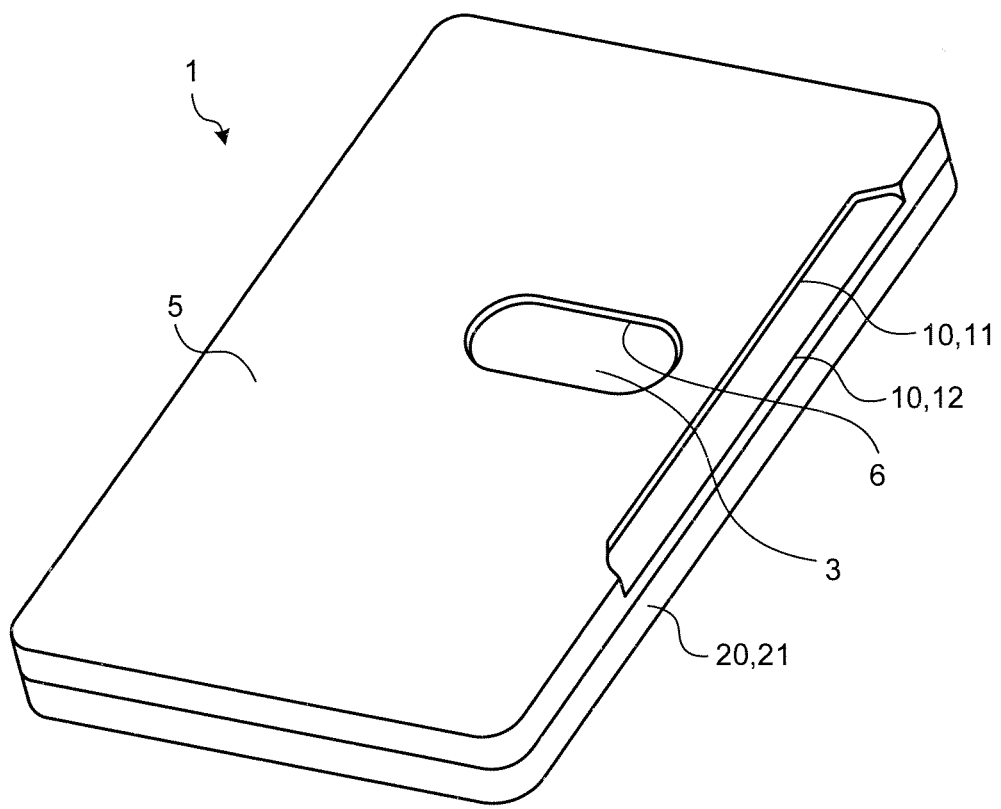
FIG. 3 is a perspective view of the image reading apparatus shown in FIG. 1.

FIG. 1 is a plan view of an image reading apparatus according to a first embodiment. FIG. 2 shows an elevation view viewed along direction of arrows A-A of FIG. 1. FIG. 3 is a perspective view of the image reading apparatus shown in FIG. 1. An image reading apparatus 1 shown in these figures is formed into a thin and substantially rectangular shape. Its outer shape is formed with a lower cover 21 which is a housing of a main body 20 of the image reading apparatus 1 and an upper cover 5 fixed to the lower cover 21. The image reading apparatus 1 is meant for or designed for reading an image on a small-size card or the like as an original. Therefore, the size of the image reading apparatus 1 is about a size such that the user can hold the image reading apparatus 1 in the user's hand.

The image reading apparatus 1, having this size, has an outer shape of substantially a board-like shape. One surface side of the board-like shape in its thickness direction is formed with the upper cover 5, and the other surface side is formed with the lower cover 21. The upper cover 5 and the lower cover 21 are connected to each other at the lateral side of the board-like shape. In this manner, the upper cover 5 forming one of the surfaces of the image reading apparatus 1 is connected to the main body 20 mainly at a peripheral portion only, and the most of the upper cover 5 is separated from the main body 20. Therefore, a space is formed between the upper cover 5 and the main body 20, and this space is formed as a reader chamber 3 being a space which the original is caused to enter when the image on the original is read by the image reading apparatus 1 according to the first embodiment.

The reader chamber 3 formed in this manner has an opening to outside thereof as an original insertion/ejection port through which the original can be inserted or ejected. The original insertion/ejection port is formed as a slit 10, having an opening of an elongated rectangular shape, on the lateral side of the image reading apparatus 1 according to the first embodiment, having the board-like shape. In the slit 10 provided in this manner as the original insertion/ejection port of the reader chamber 3, portions forming the slit 10, namely, positions of edges of the reader chamber 3 differ between a portion close to the main body 20 and a portion from the main body 20. More specifically, an upper edge portion 11, which is the portion from the main body 20, of the slit 10 is separated from the lateral side or having a setback from the lateral side, where a lower edge portion 12, which is the portion close to the main body 20, of the slit 10 is formed. As explained above, the slit 10 is formed so that there is a difference in level or setback between the upper edge portion 11 and the lower edge portion 12.

Formed in the upper cover 5 is an opening 6 having a shape of an elongate hole. The opening 6 is formed on the upper surface of the image reading apparatus 1 when the surface of the upper cover 5 side is provided as the upper surface and the surface of the main body 20 side is provided as the lower surface. That is, the opening 6 is formed on a plane portion of the upper cover 5, and has a predetermined length in the longitudinal direction thereof such that the longitudinal direction of the elongate hole, or the opening 6, is orthogonal to the lateral side along which the slit 10 is formed. The opening 6 is arranged such that a position of a center of the elongate hole, or the opening 6, in the longitudinal direction of the slit 10, substantially coincides with a position of a center of the slit 10 in the longitudinal direction of the slit 10. Furthermore, because the opening 6 is formed as the elongate hole made on the plane portion of the upper cover 5 in that manner, the reader chamber 3 is opened toward the outside also through the opening 6.

Figure 4:
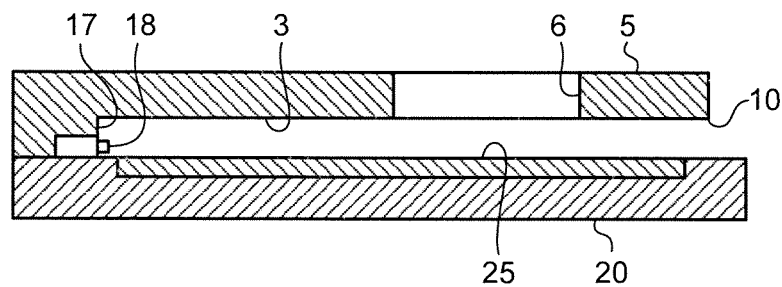
FIG. 4 is a B-B cross-sectional view of FIG. 1.

FIG. 4 is a B-B cross-sectional view of FIG. 1. Provided in the main body 20 is a sensor panel 25 being the image reading unit that can read the image on the original, and the sensor panel 25 is disposed on a surface of the main body 20 facing the upper cover 5. Therefore, the sensor panel 25 is formed as a part of the reader chamber 3. In other words, the reader chamber 3 is formed with at least the sensor panel 25 and the upper cover 5, and the upper cover 5 is provided as a cover portion forming the reader chamber 3 with at least the sensor panel 25.

Moreover, an end of the reader chamber 3 opposite to the end where the slit 10 is formed is closed, and this portion is provided as a stopper 17 which is a movement restriction unit for restricting the movement of the original when the original is inserted into the reader chamber 3. The stopper 17, being formed from the upper cover 5 toward the main body 20 side, is provided as a wall portion of the reader chamber 3. Provided also in the stopper 17 is a setting detection switch 18 being a contact detector that detects whether the original comes into contact with the stopper 17 when the original is inserted into the reader chamber 3.

Figure 5:
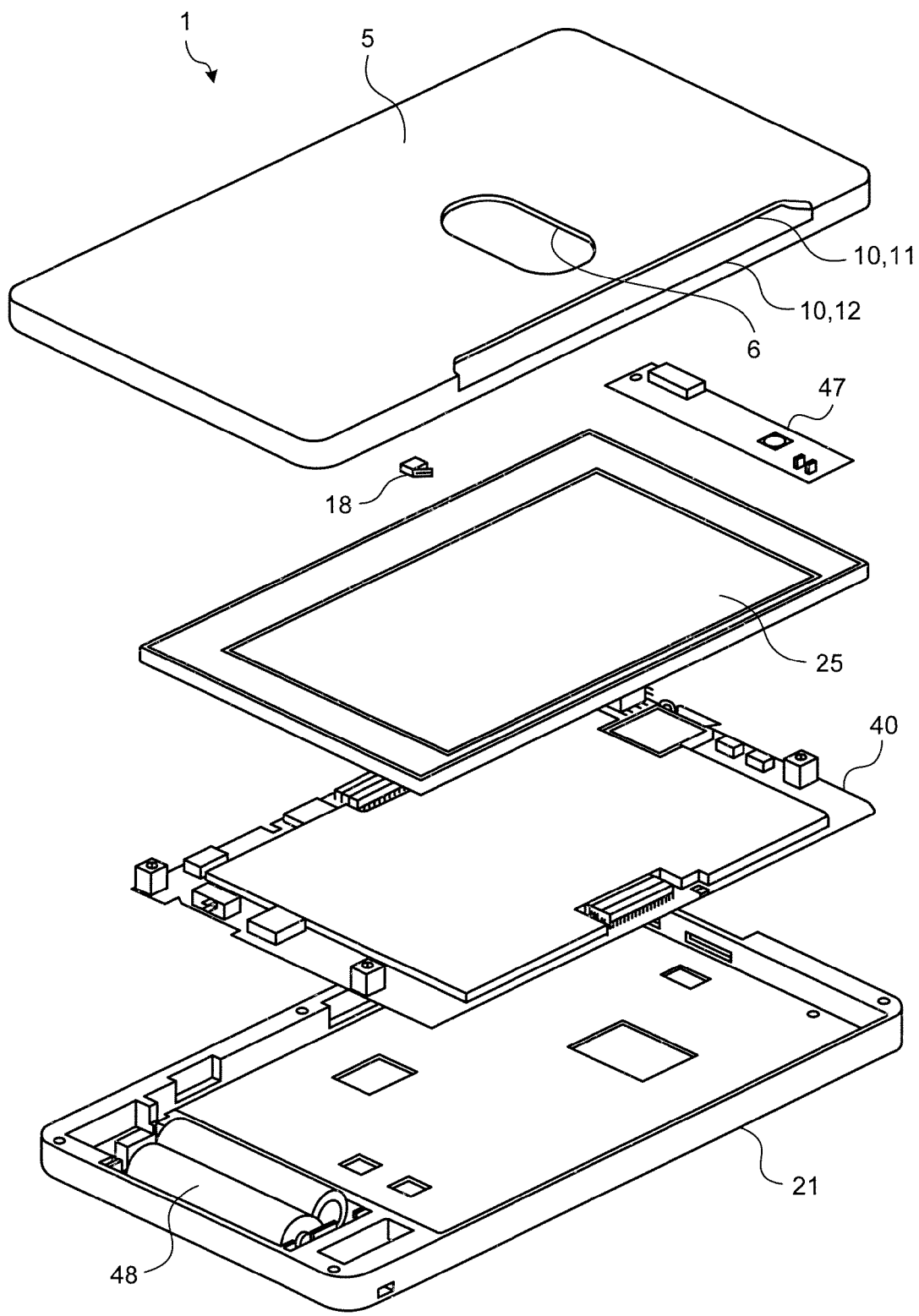
FIG. 5 is an exploded perspective view of the image reading apparatus shown in FIG. 1.

FIG. 5 is an exploded perspective view of the image reading apparatus shown in FIG. 1. Various devices are internally arranged in between the upper cover 5 and the lower cover 21. Next, these devices will be explained below. The main body 20 covered with the lower cover 21 includes the sensor panel 25 that can read the image on the original, a switchboard 47 that is provided with a selector switch (not shown) for switching between on and off of power of the image reading apparatus 1 and switches an electric power supply on and off according to the state of the selector switch, and a control board 40 that controls the units. Among these devices, the switchboard 47 and the control board 40 are internally arranged in the lower cover 21, and the sensor panel 25 is fixed to the lower cover 21 by covering the lower cover 21 from its upper cover 5 side in a state where these devices are internally arranged in the lower cover 21. Therefore, the main body 20 is formed in a state where the sensor panel 25 is provided so as to face the upper cover 5.

A battery 48 being the power supply of the image reading apparatus 1 is provided in the main body 20 so as to be easily replaceable. Electric power-operated devices provided in the image reading apparatus 1 can be operated by power supplied from the battery 48.

Figure 6:
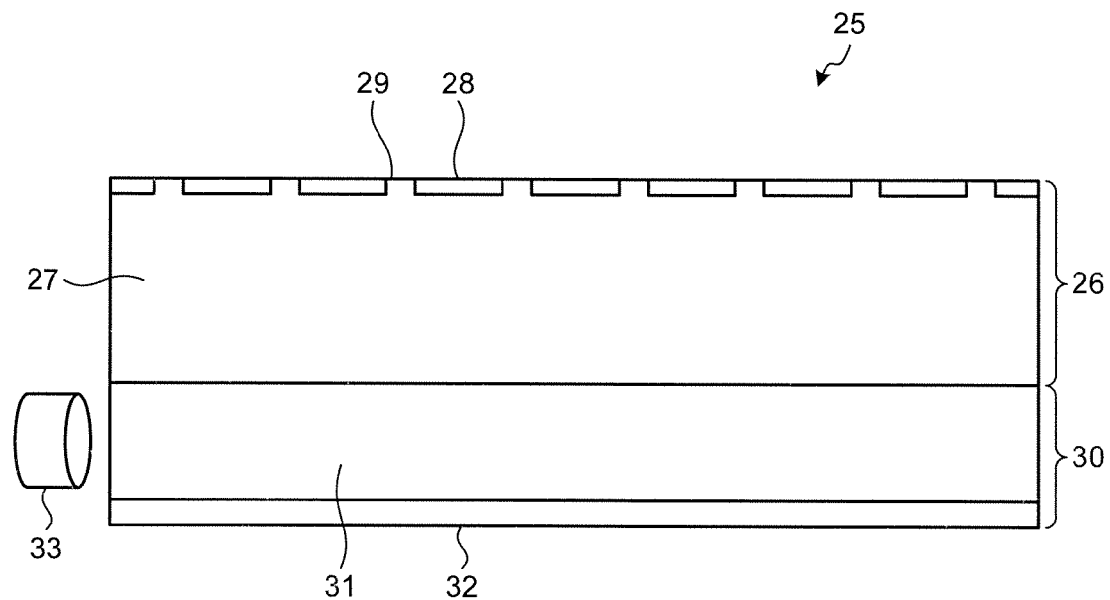
FIG. 6 is a cross-sectional view of a configuration of a sensor panel shown in FIG. 5.

FIG. 6 is a cross-sectional view of a configuration of the sensor panel shown in FIG. 5. Here, the sensor panel 25 will be explained. The sensor panel 25 includes a backlight 30, a transparent glass substrate 27 provided on the backlight 30, and a plurality of light-receiving elements 28 that are light receivers arranged in a two-dimensional array at predetermined intervals on the glass substrate 27 and that convert light received at the time of receiving the light into an electrical signal. These devices are provided in a laminated manner. Among these devices, the light-receiving elements 28 are arranged on the glass substrate 27, or to be more precisely, the light-receiving elements 28 are arranged on the surface of the glass substrate 27 in the side opposite to the side where the backlight 30 is located. The sensor panel 25 is provided as a two-dimensional contact type area sensor being a two-dimensional contact type sensor panel 25 in which the light-receiving elements 28 are two-dimensionally arranged in this manner.

The backlight 30 includes LEDs (Light Emitting Diodes) 33 as a light source, a light guide plate 31 for guiding lights emitted by the LEDs 33 to the entire glass substrate 27, and a light reflector 32. As explained above, the sensor panel 25, using the LEDs 33 as the light source, is provided with the LEDs 33 emitting three colors, i.e., R(Red), G(Green), and B(Blue), sequentially to read images, and synthesizes the read images, thus obtaining a color image. It should be noted that color image is also available by providing RGB color filters in the light-receiving elements 28 instead of using the LED 33 with the RGB three colors.

In the image reading apparatus 1 according to the first embodiment, the LEDs 33 are used as the light source provided in the backlight 30. However, any device other than the LEDs 33 may be used as the light source, for example, a light source such as a CCFL (Cold Cathode Fluorescent Lamp) may be used.

The backlight 30 is provided on the side opposite to the side where the light-receiving elements 28 are arranged in the glass substrate 27. The backlight 30 allows the lights emitted by the LEDs 33 to be guided to the entire glass substrate 27 by the light guide plate 31 and the light reflector 32 when the LEDs 33 are lighted. The glass substrate 27 is formed with a transparent material. Because of these, when the LEDs 33 are lighted or when the backlight 30 is lighted, the light emitted from the backlight 30 is transmitted through the glass substrate 27 and is irradiated through spaces between the light-receiving elements 28 in a direction opposite to the side where the backlight 30 is located, with respect to the glass substrate 27.

Thus, each of the spaces between the light-receiving elements 28 arranged on the transparent glass substrate 27 is provided as a light-emitting portion 29 that emits the light in a direction opposite to the side where the backlight 30 is located with respect to the glass substrate 27, when the backlight 30 is lighted. More specifically, because the light-receiving elements 28 arranged on the glass substrate 27 are spaced, light-emitting portions 29 are arranged around the light-receiving elements 28 respectively. In this manner, not only the light-receiving elements 28 but also the light-emitting portions 29 are arranged on the glass substrate 27, and therefore, a layer composed of the glass substrate 27 including the light-receiving elements 28 is provided as a light-receiving/emitting layer 26 capable of receiving and emitting light.

The sensor panel 25 formed in this manner is configured to receive the light reflected on the original by the light-receiving elements 28, which are arranged in the light-receiving/emitting layer 26, and read the image on the original by converting the received light into an electrical signal. Therefore, when the sensor panel 25 reads the image on the original, the sensor panel 25 reads the image by the surface on the side where the light-receiving elements 28 are arranged. Moreover, the sensor panel 25 includes the backlight 30, for emitting an irradiation light for irradiating the original, provided on the side opposite to the surface on the side where the image on the original is read. Accordingly, the sensor panel 25 is disposed so that the surface toward which the light emitted from the backlight 30 is directed and the surface on the side where the light is received by the light-receiving elements 28 are provided facing the upper cover 5 side.

Figure 7:
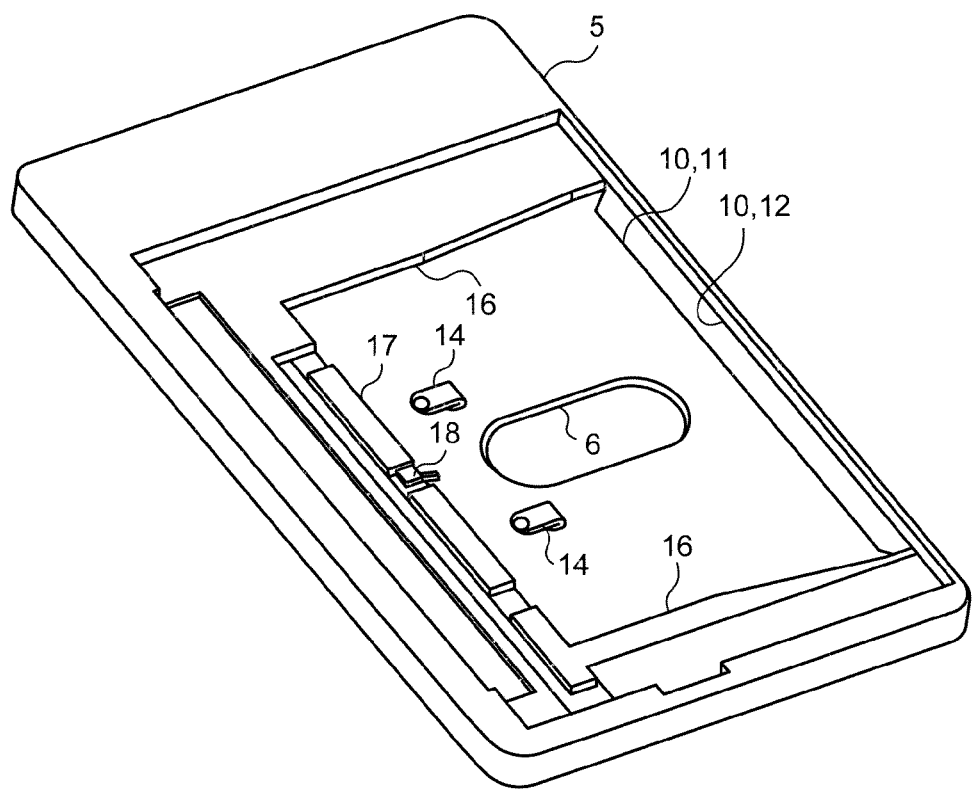
FIG. 7 is a perspective view of an upper cover when viewed from a main body side.
Figure 8:
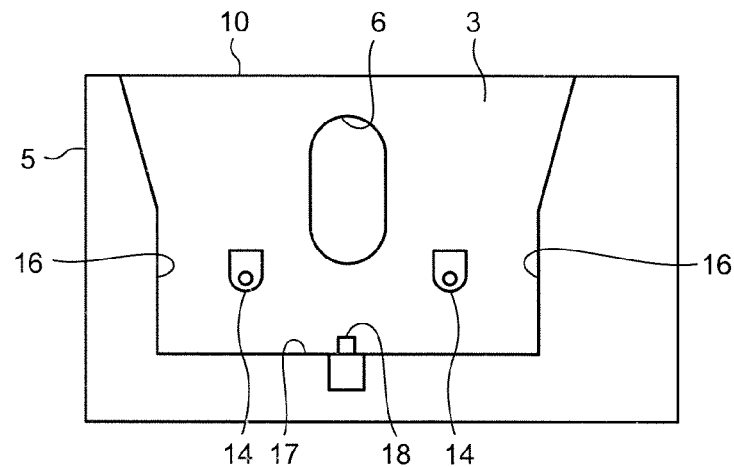
FIG. 8 is a plan view of the upper cover when viewed from the main body side.

FIG. 7 is a perspective view of the upper cover when viewed from the main body side. FIG. 8 is a plan view of the upper cover when viewed from the main body side. Provided in the upper cover 5 is the stopper 17 at the end on the side opposite to the end on the side where the slit 10 is formed. Further provided in the upper cover 5 is a side guide 16 that restricts the movement of the original in a direction orthogonal to its moving direction from the slit 10 to the stopper 17 when the original is inserted in the reader chamber 3.

The side guides 16 are provided as the wall portions of the reader chamber 3, being formed from the upper cover 5 toward the main body 20 side similarly to the stopper 17. Besides, one of the side guides 16 is formed to connect one end of the stopper 17 to corresponding one of ends of the slit 10, and the other of the side guides 16 is formed to connect the other end of the stopper 17 to the other end of the slit 10, respectively. That is, the side guides 16 include two side guides 16 facing each other. In the side guide 16 formed in this manner, the distance between the two side guides 16 at the position of the slit 10 side is wider than the distance between the two side guides 16 at the position of the stopper 17 side. More specifically, the side guides 16 are formed in such a manner that, at a portion closer to the stopper 17, the two side guides 16, facing each other, are formed in a direction orthogonal to that of the stopper 17 and the slit 10, so that the two side guides 16 are formed substantially in parallel to each other. On the other hand, the side guides 16 are formed in such a manner that, at a portion closer to the slit 10, the closer to the slit 10 side in a direction from the stopper 17 side toward the slit 10 side, the wider the distance between the two opposed side guides 16 becomes. In other words, the two side guides 16 are bent at a predetermined position between the slit 10 and the stopper 17, and in a portion closer to the slit 10 side from the bent portion, the distance between the two side guides 16 is wider as the portion approaches the slit 10. And in a portion closer to the stopper 17 side from the bent portion, the two side guides 16 are formed substantially in parallel to each other.

The side guides 16 are arranged such that, the distance between the two side guides 16, at the portion where the two opposed side guides 16 are formed substantially in parallel to each other, is slightly larger than the width of the original from which the image is read by the image reading apparatus 1 according to the first embodiment. Therefore, the distance between the two side guides 16, at the portion located close to the slit 10, rather than the portion where the two side guides 16 are formed substantially in parallel, is larger than the width of the original. The length of the slit 10 is also larger than the width of the original.

In the upper cover 5, elastic flat springs 14 are provided on the surface thereof, where the opening 6 is formed, at the side of the reader chamber 3 side, or on the surface of the main body 20 side. The flat springs 14 comprise two flat springs 14 which are arranged apart from each other, in the longitudinal direction of the slit 10 or in the longitudinal direction of the stopper 17, having a center at a center of the slit 10 in the longitudinal direction thereof, namely, on a longitudinal center line of the slit 10. Accordingly, the two flat springs 14 are arranged at substantially the same distance from the center of the slit 10 to each other. The two flat springs 14 are arranged at predetermined positions being substantially equal to each other in the distance direction between the slit 10 and the stopper 17. The flat springs 14 arranged at the positions have elasticity, which allows spring force to be applied to the direction of the main body 20.

Figure 9:
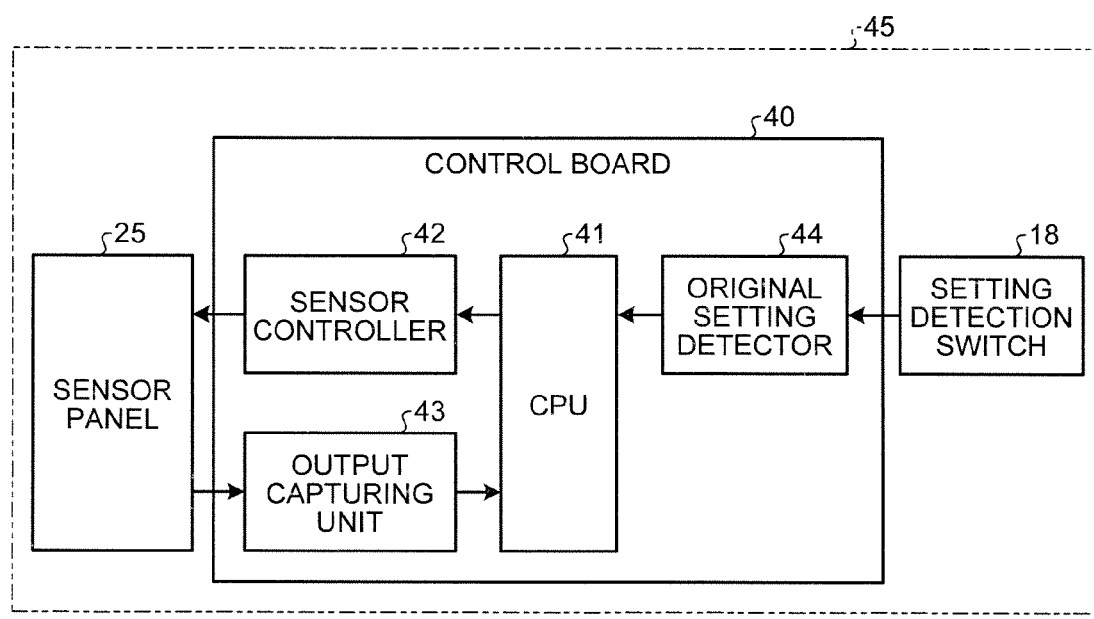
FIG. 9 is a schematic diagram of a configuration of the image reading apparatus shown in FIG. 1.

FIG. 9 is a schematic diagram of a configuration of the image reading apparatus shown in FIG. 1. The image reading apparatus 1 having above configuration is controllable by the control board 40. The control board 40, the sensor panel 25 being an actuator, and the setting detection switch 18 being a sensor constitute a reading operation unit 45 that operates when the image on the original is read. Provided in the control board 40 are a processing unit, a storage unit, and an input-output unit. The processing unit includes a CPU (Central Processing Unit) 41 that performs various computing processes.

The processing unit includes a sensor controller 42 being a read-start instruction unit that is provided so that reading of an image by the sensor panel 25 can be controlled and that causes the sensor panel 25 to start reading an image on an original when the original is inserted into the reader chamber 3, an output capturing unit 43 that captures the image read by the sensor panel 25, and an original setting detector 44 that detects whether an original whose image is read by the sensor panel 25 is set in the reader chamber 3 based on the result of detection performed by the setting detection switch 18.

Figure 10:
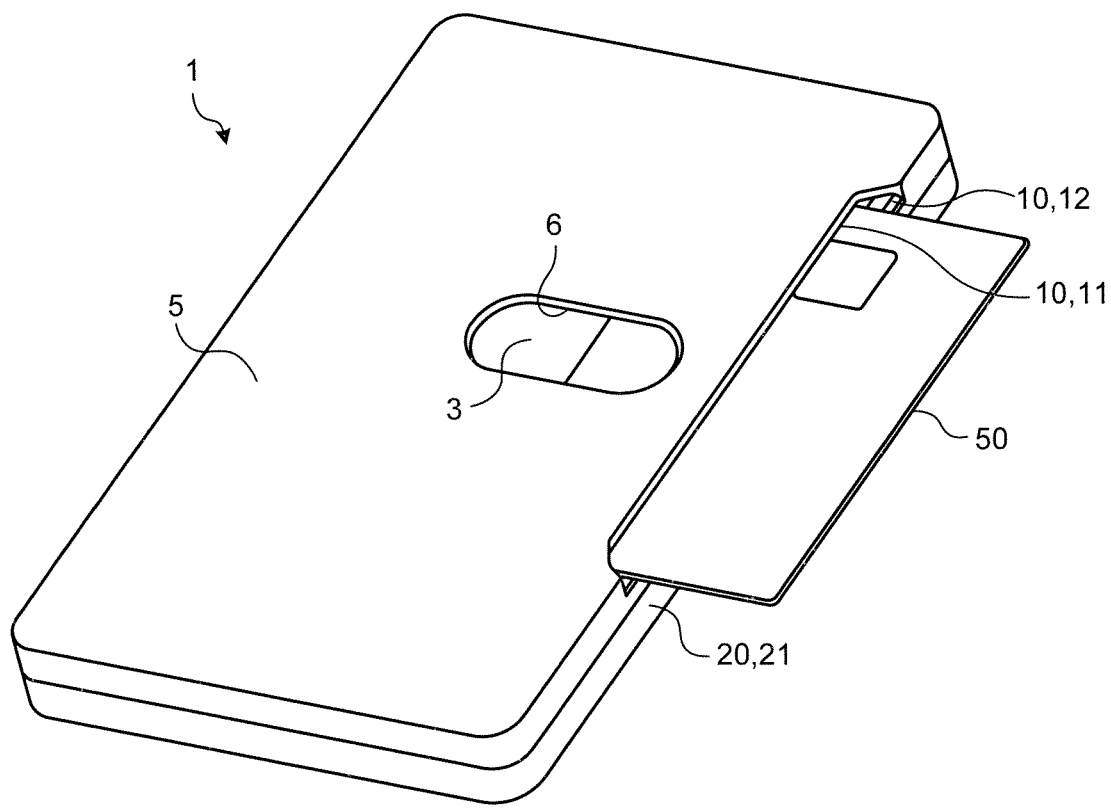
FIG. 10 is an explanatory diagram of a case where an image on an original is read.

The image reading apparatus 1 according to the first embodiment is configured in the above manner, and the function thereof will be explained below. FIG. 10 is an explanatory diagram of a case where an image on an original is read. When an image on an original 50 is read by the image reading apparatus 1, the original 50 is inserted into the reader chamber 3 through the slit 10. That is, the original 50 is inserted into the slit 10 through a space between the upper edge portion 11 and the lower edge portion 12 of the slit 10, and the original 50 is caused to enter the reader chamber 3.

Figure 11:
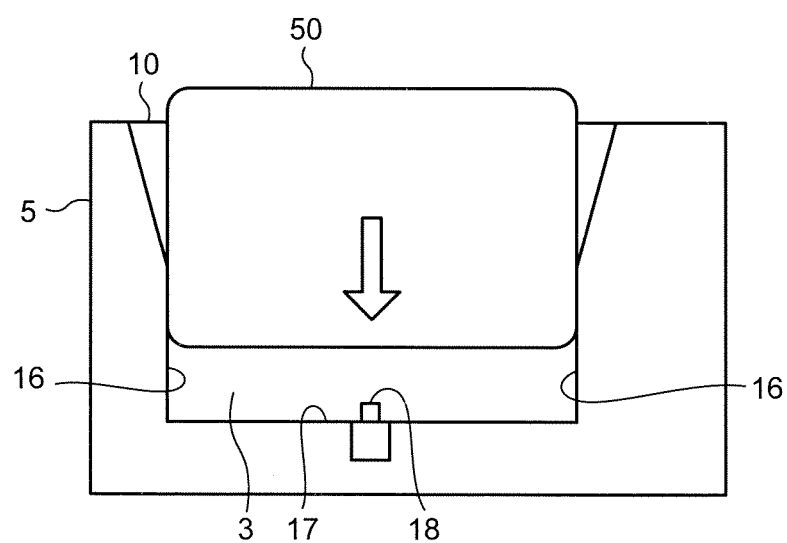
FIG. 11 is an explanatory diagram representing a state of the original when the original is caused to enter a reader chamber.

FIG. 11 is an explanatory diagram representing a state of an original when the original is caused to enter a reader chamber. Here, the case where the original 50 is caused to enter the reader chamber 3 will be explained. The length of the slit 10 is longer than a distance of a larger one of distances between opposed sides in the original 50 having a substantially rectangular shape. That is, the length of the slit 10 is wider than the width of the original 50. Therefore, the original 50 can be easily inserted into the slit 10.

The two side guides 16 provided as the wall portions of the reader chamber 3 are configured so that the distance of the two side guides 16 in the portion closer to the slit 10 is getting wider as the portion is getting closer to, or approaches the slit 10. In other words, the distance of the two opposed side guides 16 is getting narrower in the direction from the slit 10 side toward the stopper 17. Moreover, the two opposed side guides 16 are formed in parallel to each other in the portion closer to the stopper 17 so that they are separated from each other at a distance slightly wider than the width of the original 50.

Therefore, the original 50 inserted into the slit 10 is placed at an appropriate position in the distance direction of the side guides 16 by being guided by the side guides 16, as the original 50 is caused to deeply enter in the direction from the slit 10 side to the stopper 17. Thus, the original 50 is guided to a space between the two side guides 16 which are facing in parallel to each other, and the space is formed in the portion closer to the stopper 17.

In this manner, by causing the original 50 to deeply enter in the direction from the slit 10 side to the stopper 17, an orientation of the original 50 is adjusted by the force with which the original 50 is inserted so that when the original 50, having the rectangular shape, enters the space between the two side guides 16 which are opposite in parallel to each other, the sides of the original 50 positioned near the side guides 16 are oriented in the direction along the side guides 16.

Figure 12:
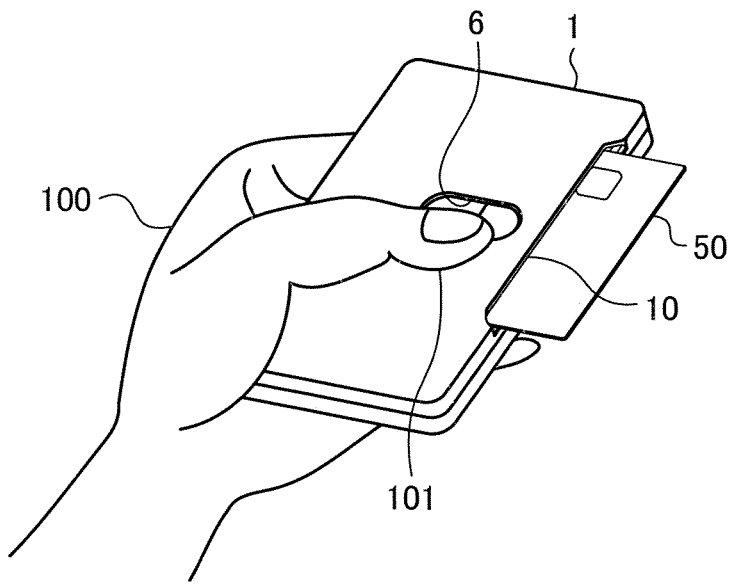
FIG. 12 is an explanatory diagram showing how to move the original with a finger.

FIG. 12 is an explanatory diagram of how to move the original with a finger. The original 50 inserted into the reader chamber 3 through the slit 10 is caused to deeply enter the reader chamber 3 by moving it along the side guides 16. When the original 50 inserted into the reader chamber 3 is to be moved along the side guides 16, the original 50 is moved by user's finger 101. More specifically, when an image on the original 50 is read by the image reading apparatus 1 according to the first embodiment, the user holds the image reading apparatus 1 in one hand 100 and inserts the original 50 thereinto through the slit 10 by the other hand. Formed in the upper cover 5 is the opening 6, being an opening portion of the reader chamber 3, which is opened in the upper surface portion of the upper cover 5 toward inside of the reader chamber 3, namely, in a direction orthogonal to the insertion/ejection direction of the original 50 when viewed from the side of the side guide 16. Therefore, the original 50 inserted into the reader chamber 3 through the slit 10 appears in the opening 6.

When the original 50 inserted into the reader chamber 3 in the above manner is to be further moved, the original 50 appearing in the opening 6 is moved by the user's finger 101. More specifically, when an image on the original 50 is read, the original 50 appearing in the opening 6 is touched by the thumb of user's hand 100 holding the image reading apparatus 1, to move the original 50 inserted into the reader chamber 3 more deeply into the reader chamber 3.

When the image on the original 50 is read, the original 50 is moved deeply into the reader chamber 3 by the finger 101 in this manner, however, the reader chamber 3 is provided with the stopper 17 on the side opposite to the slit 10 in the insertion direction of the original 50 into the reader chamber 3. Therefore, when the moved original 50 reaches the position of the stopper 17, the original 50 comes into contact with the stopper 17, and the movement of the original 50 in the insertion direction is thereby restricted.

Because the stopper 17 is provided with the setting detection switch 18, when the original 50 comes into contact with the stopper 17, the original 50 also comes into contact with the setting detection switch 18. When the original 50 comes into contact with the setting detection switch 18, the setting detection switch 18 detects the contact of the original 50 with the stopper 17, and thus, the setting detection switch 18, or the contact detector detects the contact of the original 50 with the stopper 17. When the contact of the original 50 with the stopper 17 is detected by the setting detection switch 18 in the above manner, then the sensor controller 42 causes the sensor panel 25 to start reading an image on the original 50.

The sensor panel 25 that performs a reading operation due to a start instruction of image reading received from the sensor controller 42 starts reading an image. When an image on the original 50 is read, the user moves the original 50 with the finger 101 through the opening 6, to move the original 50 up to a read start position. Therefore, after the reading is started, the image on the original 50 is read by the sensor panel 25 in a state where the original 50 is touched by the finger 101.

Here, when the original 50 is moved by the finger 101, the original 50 is moved in a desired direction while pressing the original 50 or pushing the original 50 in the direction toward the sensor panel 25. In this manner, the operation of pressing the original 50 with the finger 101 is continued after the reading operation is started by the sensor panel 25, and thus, the state where the original 50 is pressed by the finger 101 in the direction toward the sensor panel 25 is maintained during the reading of the image on the original 50. Therefore, the original 50 is pressed in the direction toward the sensor panel 25 by the force from the finger 101 during the reading of the image on the original 50, so that the original 50 comes into close contact with the sensor panel 25.

The upper cover 5 is provided with the elastic flat springs 14 on the surface of its reader chamber 3 side. The flat spring 14 generates elastic force which is applied to the original 50 as a spring force toward the sensor panel 25, when the original 50 is inserted into the reader chamber 3. Thus, the original 50 is pressed in the direction toward the sensor panel 25 by not only the force from the finger 101 but also the spring force from the flat springs 14. As explained above, the flat springs 14 are provided as a simple pressing mechanism for pressing the original 50 inserted into the reader chamber 3 in the direction toward the sensor panel 25. When the image on the original 50 is read, the original 50 is pressed toward the sensor panel 25 to come in close contact with the sensor panel 25 by the force to press the original 50 with the finger 101 and by the elastic force of the flat springs 14. Accordingly, the sensor panel 25 reads the image on the original 50 in such a state that the original 50 is in close contact with the sensor panel 25.

During the reading of the image on the original 50, since the original 50 is pressed toward the sensor panel 25 with the finger 101 and the flat springs 14 and moved on the sensor panel 25, a transparent and hard coating process is preferably applied to an image reading surface of the sensor panel 25.

Figure 13:
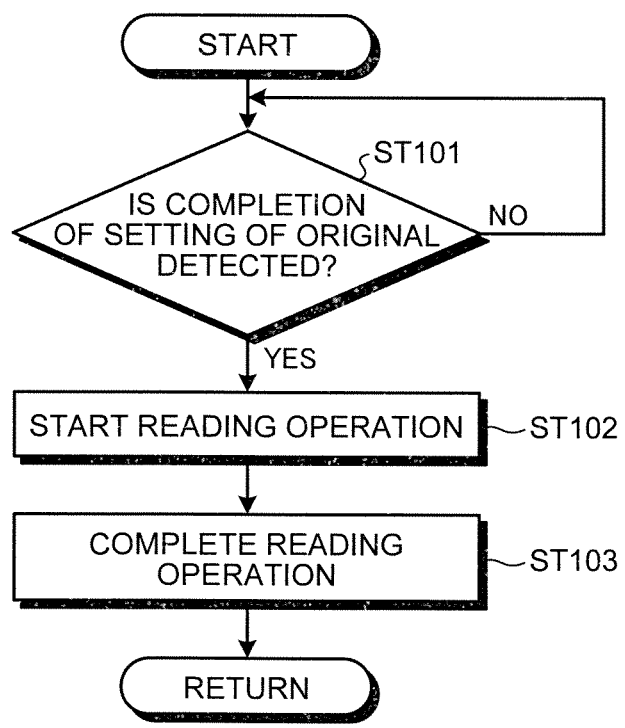
FIG. 13 is a flowchart representing an overview of a procedure when an image on an original is read.

FIG. 13 is a flowchart representing an overview of a procedure when an image on an original is read. Next, a control method for reading an image on the original 50 by the image reading apparatus 1 according to the first embodiment, namely, an overview of the procedure of reading an image on the original 50 will be explained below. When the image reading apparatus 1 according to the first embodiment reads an image on the original 50, first, it is determined whether completion of setting of the original 50 is detected (Step ST101). That is, the setting detection switch 18 is provided in the reader chamber 3, and when the setting detection switch 18 detects that the original 50 comes into contact with the setting detection switch 18, the setting detection switch 18 transmits the result of detection as an electrical signal to the original setting detector 44 provided in the processing unit of the control board 40.

The original setting detector 44 detects completion of setting of the original 50 based on the electrical signal received from the setting detection switch 18, and determines whether the original 50 is set in the reader chamber 3 and whether the original 50 is ready to be read. Thus, the original setting detector 44 determines whether the original 50 is set in the reader chamber 3. If the original setting detector 44 does not detect completion of setting of the original 50 based on the electrical signal received from the setting detection switch 18, then the original setting detector 44 repeats acquiring the electrical signal from the setting detection switch 18 until the completion of setting is detected.

On the other hand, when the original setting detector 44 detects the completion of setting of the original 50, then the reading operation is started (Step ST102). That is, when detecting the completion of setting of the original 50, the original setting detector 44 transmits electrical signal or information indicating detection of the completion of setting of the original 50 to the CPU 41, and the CPU 41 transmits the electrical signal indicating a start of the reading operation of the image to the sensor controller 42. The sensor controller 42 having received the electrical signal controls the sensor panel 25 to operate and perform the reading operation of the image. Thus, the sensor panel 25 starts the reading operation.

The reading operation of the image performed by the sensor panel 25 will be explained. When reading the image on the original 50 by the sensor panel 25, the original 50 is placed on the sensor panel 25 on the side opposite to the backlight 30 side in the light-receiving/emitting layer 26, and the LEDs 33 included in the backlight 30 of the sensor panel 25 are emitted. The light emitted by the LED 33 is guided by the light guide plate 31 to the entire light guide plate 31, and is reflected by the light reflector 32 in the portion where the light reflector 32 is located. Therefore, the light emitted by the LED 33 is emitted from the surface of the backlight 30, which is opposite side to the surface where the light reflector 32 is located, to irradiate the light-receiving/emitting layer 26. More specifically, when reading the image, the light-receiving/emitting layer 26 is irradiated with the backlight 30 by lighting the LEDs 33.

When the light-receiving/emitting layer 26 is irradiated with the backlight 30, the light from the backlight 30 transmits the glass substrate 27 provided in the light-receiving/emitting layer 26, and is output toward the original 50 through the light-emitting portions 29, where the light-receiving elements 28 are not arranged, on the surface of the glass substrate 27 opposite to the surface thereof where the backlight 30 is located. That is, when the backlight 30 is lighted, the light is irradiated to the original 50 through the light-emitting portions 29.

In this way, the light output from the light-emitting portions 29 and reaching the original 50 is reflected by the original 50. At this time, the light is reflected as a reflected light according to states of the surface of the original 50 such as color of the surface thereof. The light reflected by the original 50 is reflected toward the direction of the light-receiving/emitting layer 26, and travels toward the light-receiving/emitting layer 26. The reflected light traveling toward the light-receiving/emitting layer 26 reaches the light-receiving/emitting layer 26 from the surface of the light-receiving/emitting layer 26 on the side where the light-receiving elements 28 and the light-emitting portions 29 are located. Thus, the light-receiving elements 28 receive the reflected light reflected by the original 50.

The reflected light reflected by the original 50 becomes a reflected light according to the state of the surface of the original 50, and the light-receiving elements 28 are provided for generating an electrical signal according to the received light. Therefore, the light-receiving elements 28 that receive the reflected light reflected by the original 50 generates an electrical signal according to the state of the surface of the original 50 by which the received reflected light is reflected. At this time, because the light-receiving elements 28 are two-dimensionally arranged, the light-receiving elements 28 receive reflected light reflected by the original 50 at each position in the two-dimensional direction of the original 50, and generate electrical signals according to the state of the surface of the original 50. The electrical signals generated by the light-receiving elements 28 in this manner are transmitted to the control board 40, and are captured by the output capturing unit 43 of the control board 40, thereby acquiring image information for the original 50 on its side that the sensor panel 25 faces. Thus, the image on the original 50 is two-dimensionally read in a state where the image is converted into electrically processable information. More specifically, the image on the original 50 on the side facing the sensor panel 25 is read by the sensor panel 25.

By performing a reading operation, the image on the original 50 is read, and the reading operation is completed (Step ST103). That is, by performing the reading operation by the sensor panel 25 and the output capturing unit 43, the entire image on the original 50 in the position facing the sensor panel 25 is read, and the reading operation is completed or ended.

In the image reading apparatus 1 as explained above, the sensor panel 25 that reads the image on the original 50 is provided with the two-dimensionally arranged light-receiving elements 28, and the image on the original 50 can be two-dimensionally read. Therefore, when the image on the original 50 is read, the original 50 and the sensor panel 25 do not need to be relatively moved. Thus, no mechanically scanning mechanism such as a conveying mechanism of the original 50 is needed, thereby achieving simplification of the apparatus. In addition, when the image on the original 50 is read, the image is read without activating such a mechanically scanning mechanism. Therefore, even if vibration occurs in the middle of reading the image, the image can be read without causing displacement in the relative position between the original 50 and the sensor panel 25. This can prevent displacement in the relative position between the original 50 and the sensor panel 25 and unclear image quality of the read image due to vibration from occurring in the middle of reading the image, unlike the case where the scanning mechanism is operated to read the image on the original 50. Furthermore, when the image on the original 50 is read, the image on the original 50 is two-dimensionally read by the two-dimensionally arranged light-receiving elements 28 without activating the mechanical scanning mechanism, which enables the image to be read in a short time. Consequently, it is possible to simplify the apparatus, achieve its more compact size, and read a sharp image in a short time.

As explained above, in reading the image on the original 50, since the image can be read in a short time, a time for holding the original 50 still can be reduced. This enables to prevent displacement in the relative position between the original 50 and the sensor panel 25 from occurring more reliably. As a result, a sharp image can be more surely read.

Moreover, because the opening 6 being the opening portion of the reader chamber 3 is formed on the upper cover 5, when the original 50 is caused to enter the reader chamber 3 at the time of reading an image on the original 50, the user can move the original 50 with the finger 101 through the opening 6 to a desired position or a predetermined portion and press the original 50 with the finger 101 in the direction of the sensor panel 25. Thus, even if the conveying mechanism of the original 50 is omitted, the original 50 can be easily moved to a position suitable for reading the image on the original 50 by the sensor panel 25. Furthermore, the original 50 can be pressed by the finger 101 in the direction of the sensor panel 25, and therefore the mechanism of pressing the original 50 can be omitted. Consequently, it is possible to simplify the apparatus, achieve its more compact size, and read a sharp image more reliably, and, furthermore, achieve improved usability.

The sensor panel 25 uses the two-dimensional contact type sensor panel 25, and when the image on the original 50 is read, the original 50 is read in a state of being in close contact with the sensor panel 25. This allows the thickness of the reader chamber 3, into which the original 50 is inserted at the time of reading the original 50 by the sensor panel 25, to be thin and allows the entire thickness of the image reading apparatus 1 to be reduced. As a result, the apparatus can be more surely made compact.

Provided also in the reader chamber 3 is the stopper 17 for restricting the movement of the original 50 on the side opposite to the slit 10 which is the original insertion/ejection port being the opening in the insertion direction of the original 50 into the reader chamber 3. In this way, when the original 50 is inserted into the reader chamber 3 at the time of reading the image on the original 50, the original 50 is simply moved up to a position where the movement is restricted by the stopper 17, thus easily placing the original 50 at an appropriate position. Therefore, it is possible to more surely and easily read a desired or predetermined area of the original 50 by the sensor panel 25. As a result, the operability at the time of reading an image on the original 50 can be improved.

Provided in the stopper 17 is the setting detection switch 18, and when the setting detection switch 18 detects that the original 50 comes into contact with the stopper 17 at the time of reading the image on the original 50, the reading is started. In this way, when the image on the original 50 is read, the original 50 can be more surely read in a state where it is placed at the desired position or predetermined position. Moreover, as explained above, when it is detected that the original 50 comes into contact with the stopper 17, the reading is started. Thus, there is no need to independently perform the reading operation after the original 50 is placed at the predetermined position. This enables the image on the original 50 to be more easily read. As a result of these, the operability at the time of reading the image on the original 50 can be more reliably improved.

Provided also in the reader chamber 3 is the flat springs 14 for pressing the original 50 inserted into the reader chamber 3 in the direction of the sensor panel 25, thus more surely pressing the original 50 in the direction of the sensor panel 25. In this way, when the image on the original 50 is read, it is possible to read the original 50 in a state where it is more reliably in close contact with the sensor panel 25. As a result, the image on the original 50 can be more surely and clearly read.

The slit 10 has the upper edge portion 11 and the lower edge portion 12 whose positions are made different or have a setback in the insertion/ejection direction of the original 50. Therefore, when the original 50 is to be inserted into the reader chamber 3, there is no need to insert the original 50 into a space between the upper edge portion 11 and the lower edge portion 12 at once. This allows the original 50 to be easily inserted into the reader chamber 3 through the slit 10. As a result, the usability at the time of reading the image on the original 50 can be more surely improved.

Second Embodiment

Figure 14:
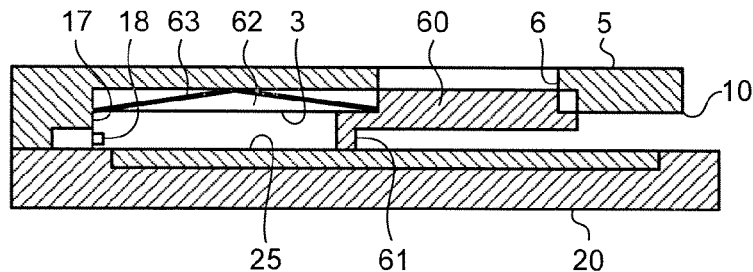
FIG. 14 is a cross-sectional view of a main portion of an image reading apparatus according to a second embodiment.

The image reading apparatus 1 according to a second embodiment is featured by an open/close cover 60 provided in the opening 6, though the rest of the components have basically the same configuration as that of the image reading apparatus according to the first embodiment. As for the components which are the same as these of the first embodiment, explanation thereof is omitted and the same numerals are assigned thereto. FIG. 14 is a cross-sectional view of a main portion of the image reading apparatus 1 according to the second embodiment. In the image reading apparatus 1 according to the second embodiment shown in this figure, the opening 6 formed on the upper cover 5 is provided with the open/close cover 60 for closing the opening 6 when the original 50 is not inserted into the reader chamber 3, e.g., when the image reading apparatus 1 is not used. The open/close cover 60 allows open/close of the opening 6 and is provided as a cover unit being openable/closable in association with insertion/ejection of the original 50 into/from the reader chamber 3.

More specifically, the open/close cover 60 is formed into a shape capable of closing the opening 6, having an area larger than at least an opening area of the opening 6 when viewed from the opening direction of the opening 6. The open/close cover 6 is disposed on the reader chamber 3 side of the upper cover 5. The open/close cover 60 is provided with an original contact portion 61 being a portion with which the original 50 comes into contact when the original 50 is inserted into the reader chamber 3. The original contact portion 61 is disposed at a portion on the sensor panel 25 side of the open/close cover 60, in other words, the original contact portion 61 is disposed on a surface of the open/close cover 60, which is on a side of the open/close cover 60 opposite to the side facing the opening 6.

Formed in the upper cover 5 is an open/close cover guide 62 being a path where the open/close cover 60 passes. The open/close cover guide 62 is formed into a groove-like shape where the open/close cover 60 can pass from the opening 6 toward the stopper 17. The open/close cover guide 62 is provided with a spring 63 that is an elastic member applying the spring force to the open/close cover 60. The spring 63 is provided between the stopper 17 and the open/close cover 60 or between a portion in the vicinity of the stopper 17 and the open/close cover 60 so as to apply the spring force, to the open/close cover 60, in a direction in which the open/close cover 60 is closed. That is, the spring 63 is provided so as to apply the spring force, to the open/close cover 60, in a direction in which the open/close cover 60 moves from the stopper 17 side toward the slit 10 side.

Figure 15:
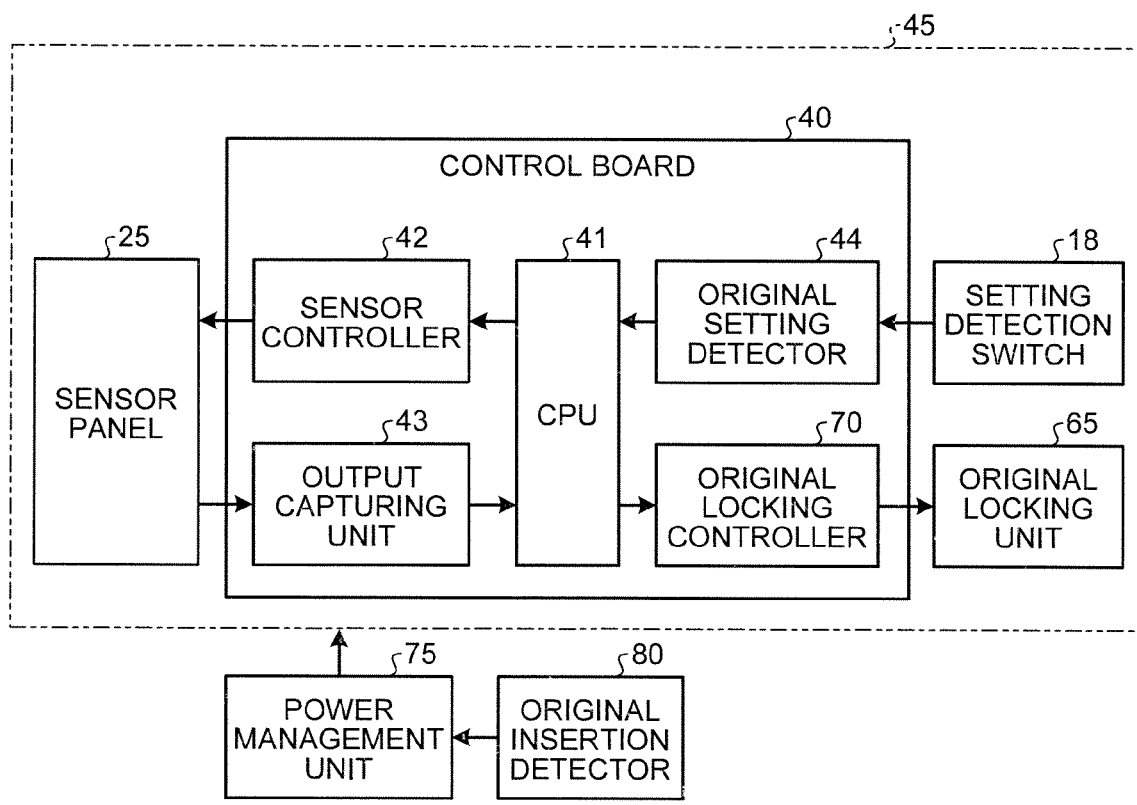
FIG. 15 is a schematic diagram of a configuration of the image reading apparatus shown in FIG. 14.

FIG. 15 is a schematic diagram of a configuration of the image reading apparatus shown in FIG. 14. The image reading apparatus 1 according to the second embodiment is provided with an original locking unit 65 that includes a mechanism, in a state where the original 50 is inserted in the reader chamber 3, for maintaining this state and stopping the movement of the original 50. When the original 50 is inserted into the reader chamber 3 and the open/close cover 60 moves to open, the original locking unit 65 locks the open/close cover 60 in its open state, thereby stopping the movement of the original 50. That is, the original locking unit 65 is provided as a movement stopping mechanism that stops the movement of the original 50 during reading of the image on the original 50 by the sensor panel 25 when the original 50 is inserted into the reader chamber 3.

It should be noted that the original locking unit 65 may be a mechanism for mechanically fixing the open/close cover 60 by providing a mechanically operated portion, or may be a mechanism for electromagnetically fixing the open/close cover 60 without providing the mechanically operated portion. As the original locking unit 65, the mechanism can lock or unlock the open/close cover 60 at an arbitrary timing and can maintain the state of opening the open/close cover 60 even if the open/close cover 60 is applied with the spring force of the spring 63 when it is locked. Any device or mechanism can be used if it performs above function. Moreover, when the original locking unit 65 is provided as described above, an original locking controller 70 for controlling the original locking unit 65 is provided in the processing unit of the control board 40, and the operation of the original locking unit 65 is controlled by the original locking controller 70.

In the image reading apparatus 1 according to the second embodiment, the reading operation unit 45 can control electric power, or electric power supply, according to a state of inserting the original 50 into the reader chamber 3. That is, the image reading apparatus 1 according to the second embodiment is provided with a power management unit 75 that manages power supplied to each unit of the reading operation unit 45 based on the state of inserting the original 50 into the reader chamber 3. There is further provided an original insertion detector 80 for detecting the state of inserting the original 50 into the reader chamber 3 or detecting that the original 50 is inserted into the reader chamber 3, and transmitting the result of detection to the power management unit 75.

A power supply route to the original insertion detector 80 is different from a power supply route to the reading operation unit 45 managed by the power management unit 75. A detector of the original 50 included in the original insertion detector 80 may detect, when the original 50 is inserted into the reader chamber 3, the insertion of the original 50 by providing a portion mechanically operated due to the insertion of the original 50, or may detect the insertion of the original 50 by optically detecting the insertion of the original 50 into the reader chamber 3.

Figure 16A:
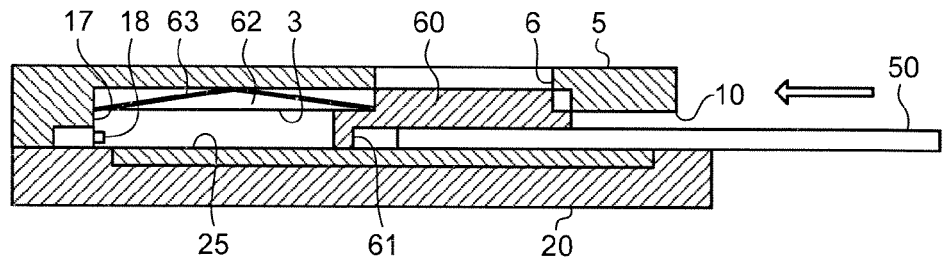
FIG. 16A is an explanatory diagram representing a movement of an open/close cover due to insertion/ejection of an original into/from the image reading apparatus shown in FIG. 14.

The image reading apparatus 1 according to the second embodiment is configured as described above, and the function thereof will be explained below. FIGS. 16A to 16D are explanatory diagrams representing a movement of the open/close cover due to insertion/ejection of an original into/from the image reading apparatus shown in FIG. 14. When the image on the original 50 is read by the image reading apparatus 1 according to the second embodiment, the original 50 is caused to enter the reader chamber 3 through the slit 10 in a state where the open/close cover 60 closes the opening 6. The original 50 is inserted into a portion between the open/close cover 60 and the sensor panel 25 in the reader chamber 3. In the reader chamber 3, the original contact portion 61 provided in the open/close cover 60 is provided at a portion on the sensor panel 25 side of the open/close cover 60 (FIG. 16A). Therefore, the original 50 inserted into the reader chamber 3 comes into contact with the original contact portion 61 of the open/close cover 60.

Figure 16B:
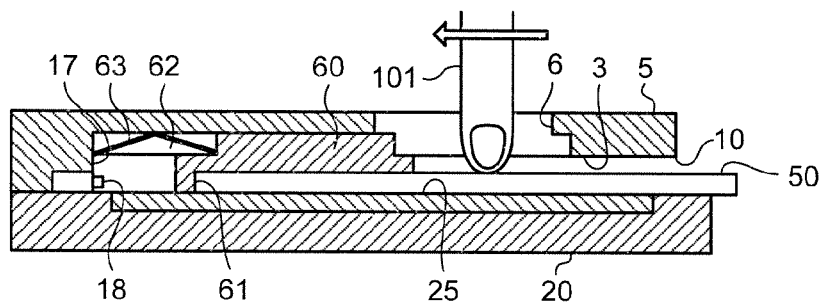
FIG. 16B is an explanatory diagram representing the movement of the open/close cover due to insertion/ejection of the original into/from the image reading apparatus shown in FIG. 14.

Spring force is applied to the open/close cover 60, which the original 50 contacts, in the direction from the stopper 17 side to the slit 10 by the spring 63. When the original 50 is pushed into the direction of the stopper 17 in a state where the original 50 is in contact with the original contact portion 61 and the pushing force exceeds the spring force of the spring 63, the open/close cover 60 moves together with the original 50 in the direction of the stopper 17. At this time, the open/close cover 60 moves along the open/close cover guide 62 while being guided by the open/close cover guide 62. The open/close cover 60 together with the original 50 moves in the direction toward the stopper 17, and opens the opening 6. When the opening 6 is opened caused by the movement of the open/close cover 60, the original 50 appears in the opening 6. When the original 50 appears in the opening 6, the user touches the original 50 with the finger 101 through the opening 6 to further move the original 50 in the direction toward the stopper 17 (FIG. 16B).

Figure 16C:
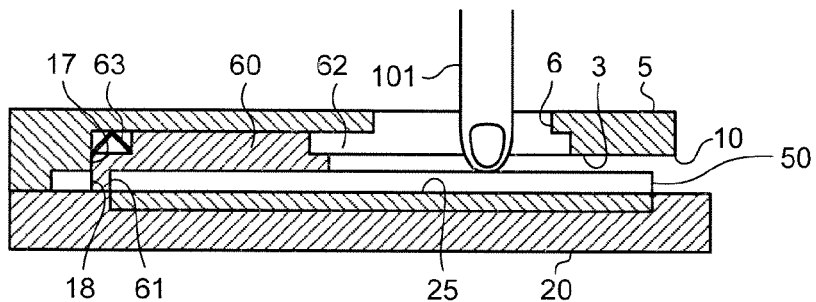
FIG. 16C is an explanatory diagram representing the movement of the open/close cover due to insertion/ejection of the original into/from the image reading apparatus shown in FIG. 14.

As described above, when the original 50 reaches near the stopper 17 by moving the original 50 with the finger 101 through the opening 6, the open/close cover 60 comes into contact with the stopper 17 (FIG. 16C). More specifically, in the image reading apparatus 1 according to the first embodiment, because the open/close cover 60 is not provided in the reader chamber 3, when the original 50 is inserted deeply into the reader chamber 3, the original 50 comes into contact with the stopper 17. On the other hand, in the open/close cover 60 including the original contact portion 61, because the original contact portion 61 is located between the original 50 and the stopper 17, when the original 50 is inserted deeply into the reader chamber 3 and the original 50 reaches near the stopper 17, the original contact portion 61 of the open/close cover 60 comes into contact with the stopper 17. Thus, movement of the original 50, together with the open/close cover 60, in the insertion direction is restricted by the stopper 17.

Moreover, because the setting detection switch 18 is provided in the stopper 17, when the open/close cover 60 comes into contact with the stopper 17, the open/close cover 60 also comes into contact with the setting detection switch 18. Thus, when the setting detection switch 18 detects the contact of the open/close cover 60, the original locking controller 70 operates the original locking unit 65 to stop the movement of the open/close cover 60 and stop the movement of the original 50. The sensor controller 42 causes the sensor panel 25 to read the image on the original 50 in this state. In this case, because the user presses the original 50 with the finger 101, the sensor panel 25 reads the image on the original 50 being in close contact with the sensor panel 25.

Figure 16D:
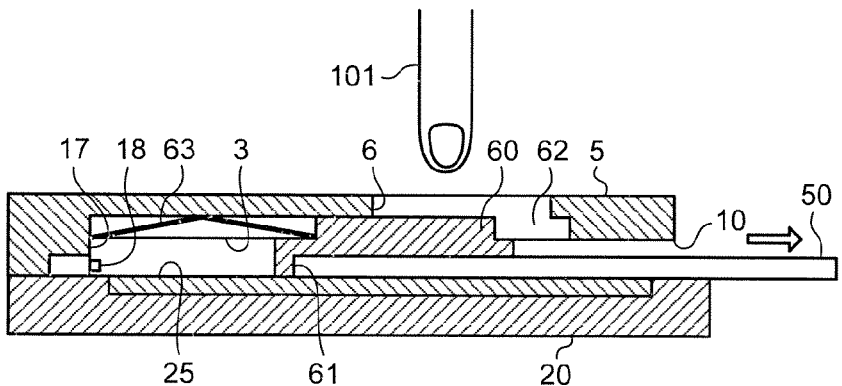
FIG. 16D is an explanatory diagram representing the movement of the open/close cover due to insertion/ejection of the original into/from the image reading apparatus shown in FIG. 14.

In this manner, when the sensor panel 25 reads the image on the original 50 and the reading is completed, the original locking controller 70 unlocks the stop state of the movement of the open/close cover 60 performed by the original locking unit 65, and unlocks the movement stop state of the original 50. When the reading of the image on the original 50 is completed, the user releases the finger 101 from the original 50 to stop pressing the original 50 through the opening 6. When the force applied to the original 50 from the user is removed by releasing the finger 101 from the original 50, the open/close cover 60, located near the stopper 17 by the force applied to the original 50 from the user, moves in the direction toward the slit 10 by the spring force applied from the spring 63. When the open/close cover 60 moves toward the slit 10, the original contact portion 61 pushes the original 50, and the original 50 also moves in the direction toward the slit 10 together with the open/close cover 60 (FIG. 16D). That is, in response to release of the finger 101 pressing the original 50, the open/close cover 60 returns to the position where it closes the opening 6 due to the restoring force of the spring 63 that has elasticity, and closes the opening 6, and then the original 50 is ejected.

Figure 17:
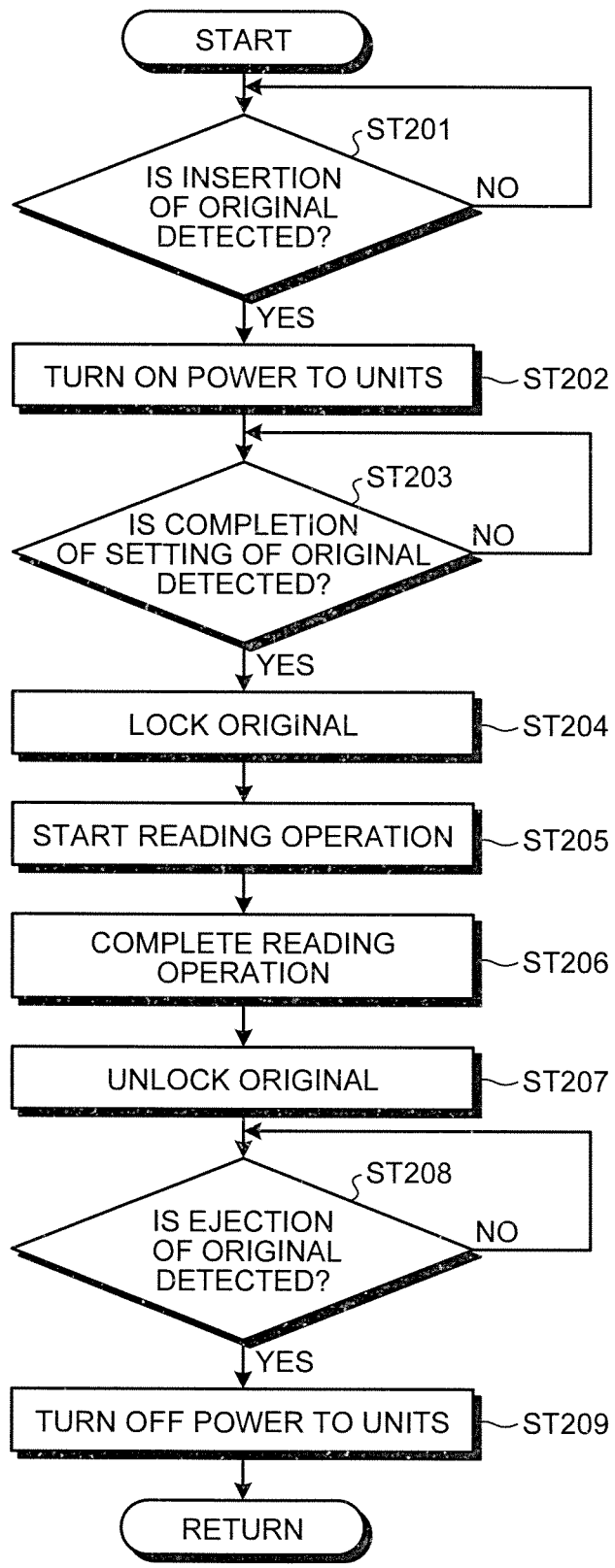
FIG. 17 is a flowchart representing an overview of a procedure when an image on the original is read by the image reading apparatus according to the second embodiment.

FIG. 17 is a flowchart representing an overview of a procedure when an image on the original is read by the image reading apparatus according to the second embodiment. The procedure when an image on the original 50 is read by the image reading apparatus 1 according to the second embodiment will be explained below. The power management unit 75 does not supply power to the reading operation unit 45 when the image reading apparatus 1 is in a standby state, and the image reading apparatus 1 stands by in a state where the power to the units of the reading operation unit 45 is off. Even in this state, the original insertion detector 80 having the supply route different from the power supply route of the reading operation unit 45 continuously detects whether the original 50 is inserted into the reader chamber 3, and determines whether the insertion of the original 50 is detected (Step ST201). The original insertion detector 80 continuously detects the insertion of the original 50 until the insertion of the original 50 is detected.

When the insertion of the original 50 is detected, the original insertion detector 80 transmits an electrical signal indicating that the insertion of the original 50 is detected to the power management unit 75. The power management unit 75 having received the electrical signal turns on the power to the units of the reading operation unit 45 (Step ST202). Thus, the power is supplied to the units of the reading operation unit 45, and the reading operation unit 45 starts the operation.

When the operation of the reading operation unit 45 is started, it is determined whether completion of setting of the original 50 is detected (Step ST203). More specifically, when the original 50 inserted into the reader chamber 3 comes into contact with the original contact portion 61 of the open/close cover 60 and the open/close cover 60 moves together with the original 50 (see FIG. 16B) and it is detected that the open/close cover 60 comes into contact with the setting detection switch 18 (see FIG. 16C), then the setting detection switch 18 transmits the result of detection as an electrical signal to the original setting detector 44. The original setting detector 44 determines whether the original 50 is set in the reader chamber 3 based on the electrical signal. When the completion of setting of the original 50 is not detected, the original setting detector 44 repeats acquisition of the electrical signal from the setting detection switch 18 until the completion of setting thereof is detected.

On the other hand, when the completion of setting of the original 50 is detected by the original setting detector 44, the original 50 is locked (Step ST204). More specifically, when the completion of setting of the original 50 is detected, the original setting detector 44 transmits a signal or information that the original 50 is detected to the CPU 41, and an electrical signal instructing to lock the original 50 is transmitted from the CPU 41 to the original locking controller 70. The original locking controller 70 having received the electrical signal controls the original locking unit 65 to operate the original locking unit 65 so as to stop the movement of the original 50 by stopping the movement of the open/close cover 60. Thus, the original locking unit 65 locks the original 50.

Next, the reading operation is started (Step ST205). More specifically, the sensor panel 25 is controlled by the sensor controller 42, and the reading operation of the image is performed by the sensor panel 25, thereby starting the reading operation. By performing the reading operation, an entire image on the original 50 at a position facing the sensor panel 25 is read by the sensor panel 25 and the output capturing unit 43, and then the reading operation is completed (Step ST206).

Next, the original 50 is unlocked (Step ST207). The unlocking of the original 50 is such that the original locking controller 70 controls the original locking unit 65 so as to release the state where the movement of the open/close cover 60 is stopped. Thus, the state where the movement of the original 50 is stopped is released and the original 50 is unlocked.

Next, it is determined whether ejection of the original 50 is detected (Step ST208). More specifically, the original insertion detector 80 detects an insertion state of the original 50, however, when the original insertion detector 80 does not detect the original 50, then it can be determined that the original 50 is ejected. Therefore, the original insertion detector 80 determines whether the original 50 is detected, and continues to detect the insertion state of the original 50 until the original 50 is not detected.

When the original 50 is not detected by the original insertion detector 80, or when ejection of the original 50 is detected, the power to the units of the reading operation unit 45 is turned off (Step ST209). More specifically, when detecting the ejection of the original 50, the original insertion detector 80 transmits an electrical signal indicating detection of the ejection of the original 50 to the power management unit 75, or stops the electrical signal to be transmitted when the original 50 is detected. Thus, the power management unit 75 stops the power supplied to the units of the reading operation unit 45.

In the image reading apparatus 1 according to the second embodiment, the opening 6 is provided with the open/close cover 60 that can open and close in association with insertion/ejection of the original 50 into/from the reader chamber 3. Therefore, when the original 50 is not inserted into the reader chamber 3, dirt, dust or the like can be prevented from entering the reader chamber 3 through the opening 6 being the opening portion of the reader chamber 3, and the dirt, dust or the like can be prevented from adhering to the sensor panel 25. Thus, the surface where the sensor panel 25 reads the image on the original 50 can be maintained to be a clean or clear state. As a result of this, the image on the original 50 can be more reliably and clearly read.

There is also provided the original locking unit 65 that stops the movement of the original 50 during reading of the image on the original 50 by the sensor panel 25, and therefore, the movement of the original 50 during reading of the original 50 can be prevented. Thus, it is possible to prevent the read image from being blurred caused by the movement of the original 50 during reading of the image on the original 50. As a result, the usability at the time of reading the image on the original 50 can be more reliably improved, and the image on the original 50 can be more surely and clearly read.

There is also provided the power management unit 75 for managing power supplied to the units of the reading operation unit 45, and the power supplied to the units of the reading operation unit 45 is implemented by managing the power by the power management unit 75 based on the insertion state of the original 50 into the reader chamber 3. Thus, there is no need to manually turn on the power when the image on the original 50 is read, and the supply of the power is stopped in any time other than the time when the image is read, thereby reducing the amount of power consumption. As a result, the operability at the time of reading the image on the original 50 can be more reliably improved, and reduction of the power consumption can be achieved.

As explained in the image reading apparatus 1 according to the first and the second embodiments, in the case of the image reading apparatus 1 that reads the image on the original 50 while the user presses the original 50 with the finger 101, the reading-state notification unit for notifying a reading state of the image on the original 50 by the sensor panel 25 is preferably provided. The reading-state notification unit may be provided with a speaker that makes notification sound, speech or the like, and the reading state may be notified by the sound from the speaker. Alternatively, the reading-state notification unit may be provided with a display unit such as an LED or an LCD (Liquid Crystal Display), and the reading state may be notified by using light emitted by the display unit or indication by the display unit. By providing the reading-state notification unit, when the image on the original 50 is read by the sensor panel 25, the user can easily recognize the reading state of the image on the original 50, for example, the user can easily recognize whether the original 50 is currently read. Thus, the user can easily recognize the timing of removing the force of pressing the original 50. As a result, the usability at the time of reading the image on the original 50 can be more reliably improved.

Figure 18:
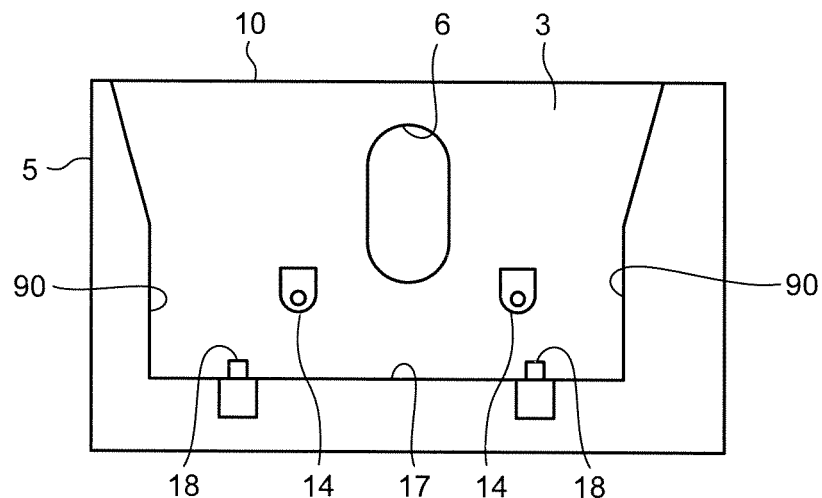
FIG. 18 is a plan view of the upper cover when viewed from the main body side representing a modification of the image reading apparatus according to the first embodiment.
Figure 19:
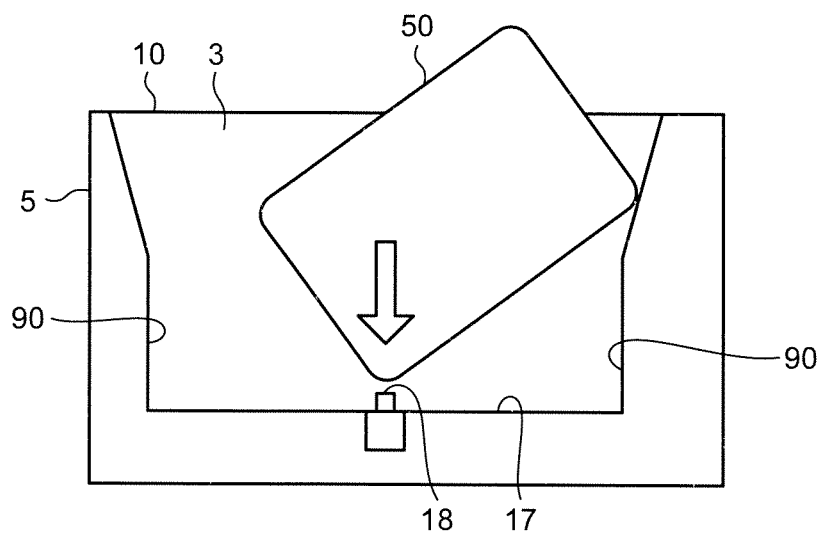
FIG. 19 is an explanatory diagram of a case where an original whose width is smaller than the width of the reader chamber is inserted thereinto.
Figure 20:
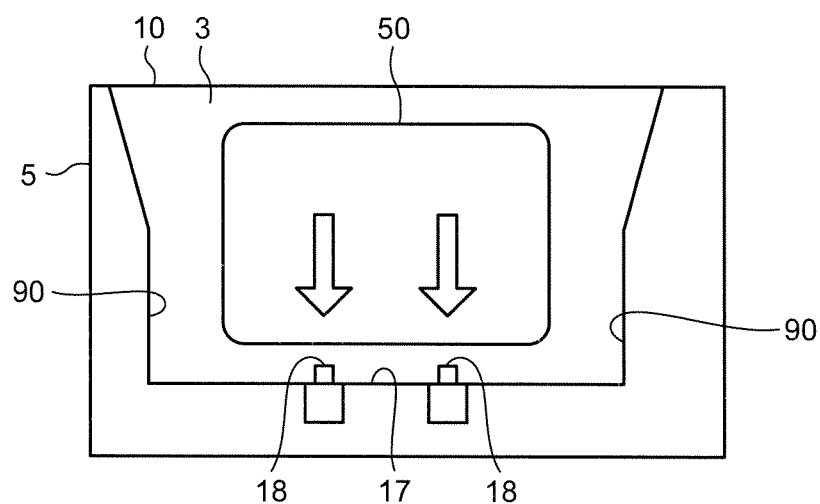
FIG. 20 is an explanatory diagram of a case where the original is inserted into the reader chamber of the image reading apparatus shown in FIG. 18.

FIG. 18 is a modification of the image reading apparatus according to the first embodiment and is a plan view of the upper cover when viewed from the main body side. FIG. 19 is an explanatory diagram of a case where an original whose width is smaller than the width of the reader chamber is inserted thereinto. FIG. 20 is an explanatory diagram of a case where an original is inserted into the reader chamber of the image reading apparatus shown in FIG. 18. In the image reading apparatus 1 according to the first embodiment, the setting detection switch 18 is provided singly in the stopper 17, however, the setting detection switch 18 may be provided in plurality. For example, as shown in FIG. 18, two setting detection switches 18 may be provided. More specifically, in the image reading apparatus 1 according to the first embodiment, the size of the original 50 whose image is read is determined, and a distance between two opposed side guides 16 is slightly larger than the width of the original 50. On the other hand, if the size of the original 50 whose image is read is not determined and a reference is not clearly provided to set a distance between side-portions 90 being wall portions located along both sides of the insertion direction of the original 50 in the reader chamber 3, two setting detection switches 18 may be provided. In addition, when the two setting detection switches 18 are provided as in this case, completion of setting of the original 50 is preferably detected when the original 50 comes into contact with both the setting detection switches 18.

That is, when the size of the original 50 whose image is read is determined, the orientation of the original 50 is adjusted by the side guides 16 (see FIGS. 10 and 11), and thus the original 50 is inserted in its orientation substantially parallel to the insertion direction. Therefore, even if only one setting detection switch 18 is provided, the case where the original 50 comes into contact with the setting detection switch 18 indicates that the original 50 is set in appropriate orientation, and the reading operation is started after the original 50 comes into contact with the setting detection switch 18, thereby performing normal reading.

On the other hand, when the size of the original 50 whose image is read is not determined, there is a case where the original 50 whose width is smaller than the distance between the side-portions 90 is inserted into the reader chamber 3. In this case, the original 50 is inserted in such a manner that a position and an angle of the original 50 to be inserted are not uniform. Therefore, when only one setting detection switch 18 is provided, for example, as shown in FIG. 19, there is a case where the original 50 may come into contact with the setting detection switch 18 even if the original 50 is obliquely inserted into the reader chamber 3. When the original 50 comes into contact with the setting detection switch 18, the original setting detector 44 detects that setting of the original 50 is completed. Therefore, when the original 50 whose width is smaller than the distance between the side-portions 90 is inserted, completion of setting of the original 50 may sometimes be detected even if the original 50 is obliquely inserted as disclosed in FIG. 19. In this case, because reading the image on the original 50 is started although the original 50 is obliquely inserted, the image on the original 50 cannot be read accurately.

Therefore, when the size of the original 50 whose image is read is not determined, two setting detection switches 18 are provided. When the original 50 whose width is smaller than the distance between the side-portions 90 is inserted, as shown in FIG. 20, it is detected whether the original 50 comes into contact with the two setting detection switches 18, thus detecting whether setting of the original 50 is completed in its appropriate orientation. This enables to detect that the original 50 is set in the appropriate orientation even if the size of the original 50 is not determined, and, therefore, the reading operation can be started after the original 50 is set in the appropriate orientation. As a result, the image on the original 50 can be more reliably and appropriately read regardless of the size of the original 50.

Figure 21:
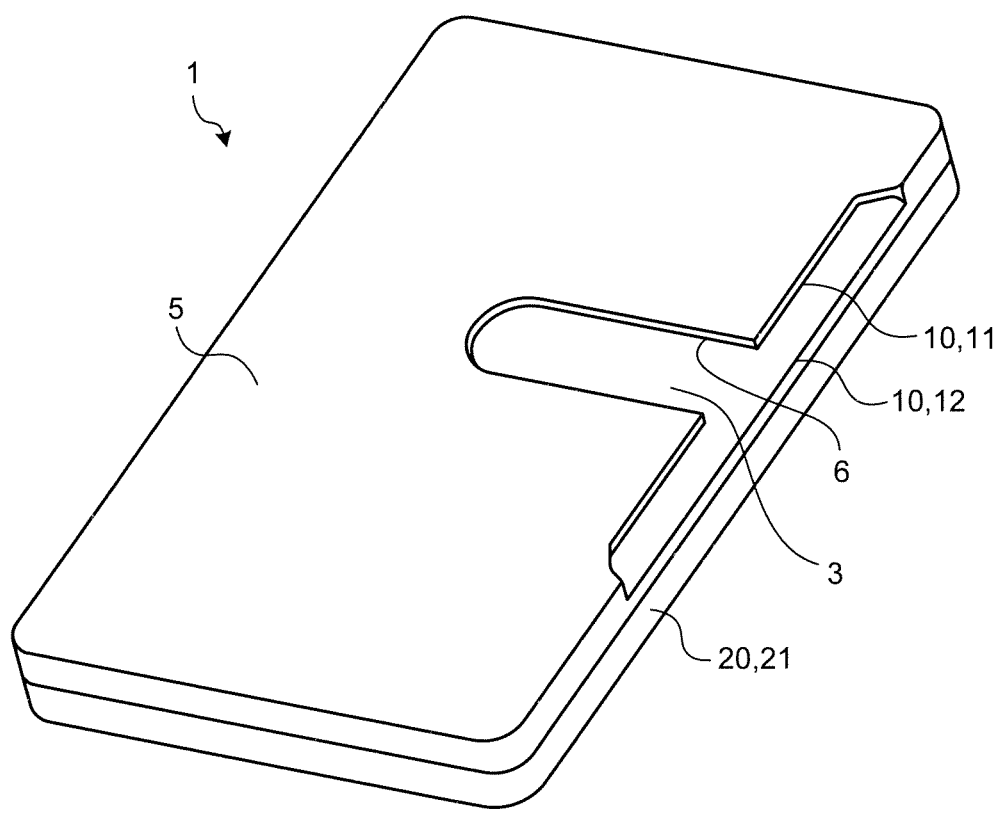
FIG. 21 is an explanatory diagram representing a modification of an opening.
Figure 22:
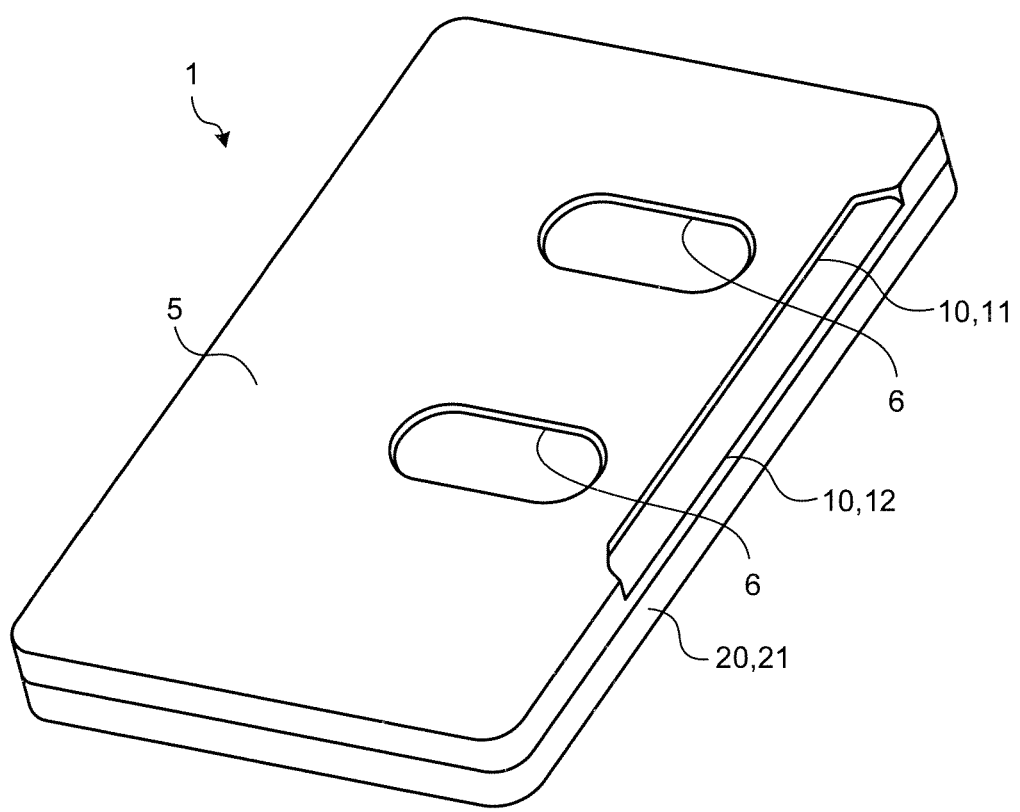
FIG. 22 is an explanatory diagram representing a modification of the opening.

FIG. 21 and FIG. 22 are explanatory diagrams of modifications of the opening respectively. In the image reading apparatus 1, the opening 6 is formed into a shape of one elongated hole on the upper cover 5, however, the opening 6 may be formed into any shape other than this. For example, as shown in FIG. 21, the opening 6 may be connected to the upper edge portion 11 of the slit 10, so that the opening 6 may be formed into a U shape that is open to the slit 10. Moreover, as shown in FIG. 22, two openings 6 may be formed on the upper cover 5. As is clear from these examples, the form is no object or any form will be all right if the opening 6 is provided as the opening portion of the reader chamber 3 that is opened toward inside of the reader chamber 3, namely, in the direction orthogonal to the insertion/ejection direction of the original 50 when viewed from the side of the side guide 16, and if the original 50 inserted into the reader chamber 3 can thereby be moved by the finger 101 and the original 50 can thereby be pressed in the direction of the sensor panel 25.

Likewise, the flat springs 14 formed in the upper cover 5 may be provided in any other form. More specifically, for the simple pressing mechanism for pressing the original 50 inserted into the reader chamber 3 toward the sensor panel 25 as exemplified by the flat springs 14, the number of the simple pressing mechanism is not limited by the examples shown in the embodiments and the form thereof may be formed with any device other than the flat spring 14.

Furthermore, in the image reading apparatus 1, the upper edge portion 11 and the lower edge portion 12 of the slit 10 are formed on the upper cover 5. However, both the edges are not necessarily formed on the upper cover 5, and thus, for example, the lower edge portion 12 may be provided on the main body 20. The slit 10 is provided as the original insertion/ejection port of the reader chamber 3 through which the original 50 can be inserted and ejected into and from the reader chamber 3, and thus, the positions of the upper edge portion 11 and the lower edge portion 12 are simply provided differently in the insertion/ejection direction of the original 50.

According to an aspect of this invention, the image reading unit that reads the image of the original includes the light receiving units that are two-dimensionally arranged, so that the image of the original can be read in the two-dimensional direction. Therefore, when the image of the original is read, there is no need to relatively move the original and the image reading unit, which does not require a mechanical scanning mechanism such as a conveying mechanism of the original, the apparatus is simplified and the image can be read in a short time. As a result of these, it is possible to simplify the apparatus, achieve its more compact size, and read a sharp image in a short time.

According to another aspect of this invention, the opening is formed in the cover portion. Therefore, when the original is caused to enter the reader chamber at the time of reading the image of the original, a user can move the original through the opening to a desired or predetermined position and can press the original with the finger in the direction of the image reading unit. Thus, even if the conveying mechanism for the original is omitted, the original can be easily moved to a position suitable for reading the image by the image reading unit.

According to further aspect of the invention, because the openable/closable cover unit is provided in the opening, when the original is not inserted in the reader chamber, dirt or the like can be prevented from entering the reader chamber through the opening portion of the reader chamber, and dirt and dust or the like can be prevented from adhering to the image reading unit. As a result of this, the image of the original can be more reliably and clearly read. Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
   an image reading unit including a sensor panel that reads an image on an original in two-dimensional directions, the sensor panel including:
   a backlight,
   a transparent glass substrate laminated on the backlight,
   a plurality of light receiving units arranged in two-dimensional array at predetermined intervals and laminated on the glass substrate, and
   light-emitting portions arranged around respective one of the plurality of light receiving units;
   a cover portion that forms a reader chamber with the image reading unit, the reader chamber having therein a space for containing the original, and a common insertion/ejection port through which the original is inserted into and discharged from the reader chamber, wherein one end of the reader chamber opposite to another end having the common insertion/ejection port is closed; and
   a read-start instruction unit that instructs the image reading unit to start reading the image on the original when the original is inserted into the reader chamber.

2. The image reading apparatus according to claim 1, wherein the cover portion has an opening that is an opening portion of the reader chamber which is opened toward inside of the reader chamber and in a direction orthogonal to an insertion/ejection direction of the original.

3. The image reading apparatus according to claim 2, further comprising a cover unit for the opening, the cover unit being openable and closable in association with insertion and ejection of the original into and from the reader chamber.

4. The image reading apparatus according to claim 1, wherein the reader chamber includes a movement restriction unit that restricts movement of the original and is disposed on a side of the reader chamber opposite to the original insertion/ejection port in the insertion direction of the original into the reader chamber.

5. The image reading apparatus according to claim 4, wherein
   the movement restriction unit includes a contact detector that detects contact of the original with the movement restriction unit, and
   the read-start instruction unit that instructs the image reading unit to start reading the image on the original, when the contact detector detects the contact of the original with the movement restriction unit.

6. The image reading apparatus according to claim 1, wherein the reader chamber includes a pressing mechanism for pressing the original inserted into the reader chamber in a direction toward the image reading unit.

7. The image reading apparatus according to claim 1, wherein the original insertion/ejection port has a setback in the insertion/ejection direction of the original where an opening position of the original insertion/ejection port on the image reading unit side differs from an opening position of the original insertion/ejection port on the image reading unit side on a side of a position apart from the image reading unit.

8. The image reading apparatus according to claim 1, further comprising a power management unit that manages power supplied to the units based on an insertion state of the original into the reader chamber.

9. The image reading apparatus according to claim 1, further comprising a reading-state notification unit that notifies a reading state of the image on the original by the image reading unit.

10. The image reading apparatus according to claim 1, further comprising a movement stopping mechanism that stops movement of the original during reading of the image on the original by the image reading unit.

* * * * *